(12) United States Patent
Nakamura

(10) Patent No.: US 8,739,657 B2
(45) Date of Patent: Jun. 3, 2014

(54) WIRE STRIPPER

(71) Applicant: Komax Holding AG, Dierikon (CH)

(72) Inventor: Akio Nakamura, Tokyo (JP)

(73) Assignee: Komax Holding AG, Dierikon (CH)

( * ) Notice: Subject to any disclaimer, the term of this patent is extended or adjusted under 35 U.S.C. 154(b) by 0 days.

(21) Appl. No.: 13/955,087

(22) Filed: Jul. 31, 2013

(65) Prior Publication Data

US 2014/0033875 A1     Feb. 6, 2014

(30) Foreign Application Priority Data

Aug. 1, 2012 (JP) .................................. 2012-170711

(51) Int. Cl.
    *H02G 1/12*         (2006.01)

(52) U.S. Cl.
    CPC .............. *H02G 1/12* (2013.01); *H02G 1/1202* (2013.01); *H02G 1/1204* (2013.01); *H02G 1/1207* (2013.01)
    USPC ................. 81/9.4; 81/9.43; 81/9.51

(58) Field of Classification Search
    CPC ........................................................ H02G 1/12
    USPC ........................................... 81/9.4, 9.51, 9.43
    See application file for complete search history.

(56) References Cited

U.S. PATENT DOCUMENTS

| | | | | |
|---|---|---|---|---|
| 2,671,363 A | * | 3/1954 | Wells | 81/9.51 |
| 4,601,093 A | * | 7/1986 | Cope | 29/564.4 |
| 4,682,272 A | * | 7/1987 | Furlong et al. | 361/437 |
| 4,850,221 A | * | 7/1989 | Zielke | 73/37.5 |
| 4,999,910 A | * | 3/1991 | Cross | 29/825 |
| 5,140,873 A | * | 8/1992 | Schwartzman | 81/9.43 |
| 7,140,273 B2 | * | 11/2006 | Palmowski et al. | 81/9.51 |

FOREIGN PATENT DOCUMENTS

| | | |
|---|---|---|
| JP | H0787643 A | 3/1995 |
| JP | H10112913 A | 4/1998 |
| JP | 3501596 B2 | 3/2004 |
| JP | 4883821 B1 | 2/2012 |
| WO | 2012015062 A1 | 2/2012 |

* cited by examiner

*Primary Examiner* — Lee D Wilson
*Assistant Examiner* — Danny Hong
(74) *Attorney, Agent, or Firm* — Fraser Clemens Martin & Miller LLC; William J. Clemens

(57) ABSTRACT

A wire stripper detects contact between a core wire of an electric wire and stripping blades and detects if the electric wire is cut short. The wire stripper includes a signal analyzer circuit that measures an impedance through the stripping blades for a change in the impedance caused by contact with the wire core and a buffer circuit, that when a contact of the stripping blades with the wire core is detected, applies a signal having the same level as that of an electric signal applied to the stripping blades to a side of a shielding material of a shielded cable for transmitting the electric signal to and from the stripping blades so as to reduce or prevent current leakage between a signal line of the shielded cable and the shielding material.

10 Claims, 12 Drawing Sheets

Operation Flow Chart

WIRE STRIPPER

FIELD

The present invention relates to a wire stripper having a core contact detecting function, that is a function of detecting a contact between a wire core of an electric wire and stripping blades and capable of detecting a contact therebetween even if the electric wire is cut short; and reducing attenuation of a signal at the detection to improve accuracy thereof.

BACKGROUND

There is known a wire coating stripping apparatus (hereinafter may be referred to as a wire stripper) configured such that stripping blades are fed into a coating of an electric wire and the stripping blades are moved relatively against the electric wire, thereby to strip (strip away) a part of the coating.

When the wire coating is stripped by such a wire stripper, it is necessary to feed the stripping blades into the wire coating as deeply as possible to make a cutting edge of the wire coating more precise and sharp. The wire core may, however, be subject to be scratched or a part of it may be cut off if the blade comes in contact with the wire core to result in rejection of the electric wire concerned.

Since absolute safety is demanded especially for the electric wire for automotive or aircraft industries, even an electric wire having the slightest scratches on its core is rejected for the reason that it may be damaged and lead to serious accidents if used for movable parts or in any position subject to vibrations because of stress concentration on the scratches.

A function to detect any contact between the wire core and the stripping blade is, therefore, deemed as indispensable for the wire stripper so that a number of automatic wire strippers developed in recent years are provided with the said function of contact detection. Most of them, however, use a method to detect any contact between the wire core and the blade through detection of electric conduction between electrodes which are allocated to them, respectively.

As an example, a wire core scratch detector according to the patent document 1 (Japanese Patent Application Laying Open (KOKAI) No. 7-87643) referred to later is described in the following while taking FIG. 10 as the basis.

According to this heretofore known technique, an electric wire 63 is led through a wire guide 84 and fastened by a wire gripper 85. A cassette blade 86 is then put into operation to make an incision on an insulating coating 71 of a core 70 of the electric wire 63 by means of incision making cutters 87 and to cut the electric wire 63 by means of cutting blades 82 so as to strip the coating by simultaneously pulling it axially by means of a wire gripper 85.

When the incision making cutters 87 in the cassette blade 86 come now in contact with the wire core 70 in the phase of incision to the coating 71, an alternating current flows through it by way of a capacitance arising between the electric wire 63 and the wire gripper 85, a detector 88 and an AC power supply 89 in the said order. A voltage corresponding to this current is detected by the detector 88 to confirm the contact of the incision making cutter 87 with the wire core 70.

It is extremely difficult for the method of detecting core scratches according to the patent document 1 as shown in FIG. 10 to ensure a point to attach a corresponding mechanism if the electric wire to be finished is of short lengths. The said detection method is inappropriate also from the safety point of view in case of manual stripping operation by use of a desktop wire stripper.

In view of this, the present applicants have already proposed a wire stripper (hereinafter referred to as a wire stripper of our prior patented invention) as in the following patent document 2 (Japanese Patent No. 4883821) disclosing an earlier filed patent application owned by the applicants, which uses a cutter (stripping blades) as a detection sensor to detect an impedance (including resistance, inductance, and capacitance) of a wire core of an electric wire, and thereby to be able to detect a wire core scratch with high precision under the same conditions for the electric wire cut to any length, no matter how short or how long it is.

According to the wire stripper of the prior patented invention, as illustrated in FIG. 11, an electric signal from an electric signal generator circuit (signal generating circuit) 75 passes through a current limiting circuit 76 to a conductor 73 and then given to stripping blades 27 and 27. The electric signal further passes through a filter circuit 77 for removing noise and the like, then through a signal amplifier circuit 78 for monitoring a minute change at the moment of a contact of the stripping blades 27 and 27 with the wire core 70, and then transmitted to a signal analyzer circuit 74. A logic circuit for determination (signal determination circuit) 80 receives a signal from the signal analyzer circuit 74 and a preset determination time for wire coating stripping operation from a control circuit 79 to finally determine whether or not there is a contact between the stripping blades 27 and 27 and the wire core 70. If a determination is made that there is a harmful contact therebetween, an error (Err) is displayed on a display window 21 with a display device.

The electric signal can be sampled in cycles e.g. on the microsecond time scale. When the stripping blades 27 contact the wire core 70 of electric wire W (63), a pulse output is generated according to the position of the stripping blades at a time when the coating 71 is stripped. The pulse is detected by the signal analyzer circuit 74 as a change in impedance caused by addition of the impedance of the wire core 70.

In this manner, when a detection is made whether or not the stripping blades contact the core wire, the contact position and temporal elements can be arbitrarily set to monitor the temporal elements such as the contact time between the stripping blades 27 and 27 and the core wire 70, and the position thereof during the period of time immediately from the start of the stripping operation to the end thereof, the function of which can be used to determine that even if the stripping blades contact the core wire, the wire is not considered as defective depending on the degree and the position thereof so as to prevent unwanted operation stop when the wire stripper is adopted in an automatic machine and the like.

SUMMARY

Technical Problem: In the wire stripper of the prior patented invention, as illustrated in FIG. 12(A), a center conductor 73 connecting between the signal generating circuit 75 or the signal determination circuit 80 (these are incorporated in the control board 53 illustrated in FIG. 10, and schematically illustrated with the other circuit components omitted) and the stripping blades (blades) 27 is a signal line of a shielded wire (shielded cable) 100, and the side of the shielding material of the shielded wire (metal conductor) 101 is grounded. Note that in the shielded wire 100, an insulating coating of the center conductor 73, that is an insulating outer sheath around the shielding material 101, is not illustrated (hereinafter the same as above).

Thus, when the electric signal is transmitted to the stripping blades 27 or from the stripping blades 27 through the center conductor 73 of the shielded wire 100, as equivalently illustrated in FIG. 12(B), a potential difference between the conductor 73 and the shielding material 101 causes signal current leakage through a capacitance 102 interposed therebetween. This results in an increase in attenuation of the electric signal and a reduction in detection precision at a time of detecting a contact of the stripping blades 27 with the wire core 70 in the above described manner, which may prevent an accurate contact determination. In addition, this varies depending on the length of the shielded wire 100, and signal level is likely to change by external factors such as noise. Differently from the prior patented invention, the above is the same as the other methods of mechanisms for detecting a change in the electric signal applied to the stripping blades.

An object of the present invention is such that for example, in the same manner as in the prior patented invention, the wire stripper uses the stripping blades as a detection sensor to detect an impedance (including resistance, inductance, and capacitance) of a wire core of an electric wire, and thereby to be able to detect a wire core scratch with high precision under the same conditions for the electric wire cut to any length, no matter how short or how long it is, so as to reduce or prevent current leakage between the signal line and the shielding material at detection, and to improve detection performance and contact determination precision without being affected by the length of the shield wire or noise or the like.

Solution to Problem: Specifically, the present invention relates to wire stripper configured to feed stripping blades into coating of an electric wire and to strip a part of the coating by moving the stripping blades relatively against the electric wire, wherein it is provided with an electric signal generator circuit which for example, generates the electric signal for detecting an impedance (including resistance, inductance, and capacitance) through the stripping blades; a signal analyzer circuit which for example, detects a change in the electric signal caused by the impedance; a shielded wire which transmits the electric signal to the stripping blades and the changed electric signal from the stripping blades through a center conductor (signal line); and a signal applying means which applies a signal having the same level as that of the electric signal or/and the changed electric signal to a shielding material arranged in an outer periphery of an insulating coating of the center conductor, so that when the stripping blades contact the wire core of the electric wire in a process of stripping the coating from the electric wire, the changed electric signal from the stripping blades, for example, a change in the impedance caused by addition of the impedance of the wire core to the stripping blades, is detected, and thereby a contact of the stripping blades with the wire core is detected; and the signal applying means reduces or prevents current leakage between the center conductor (signal line) of the shielded wire and the shielding material of the shielded wire at the detection.

Advantageous Effects of Invention: The present invention can use the stripping blades as a detection sensor to detect a change in an electric signal applied to the stripping blades, for example, an impedance (including resistance, inductance, and capacitance) of a wire core of the electric wire, and thereby to be able to detect a wire core scratch with high precision under the same conditions for the electric wire cut to any length, no matter how short or how long it is.

Further, there is provided a signal applying means which applies a signal having the same level as that of the electric signal to the stripping blades or/and the changed electric signal from the stripping blades, to the shielding material of the shielded wire that transmits the electric signal to the stripping blades or from the stripping blades. The signal applying means substantially eliminates a potential difference between the center conductor and the shielding material at a position in the signal traveling direction, and thus to be able to reduce or prevent current leakage (accordingly signal attenuation) which can be caused by a capacitance existing between the signal line of the shielded wire and the shielding material of the shielded wire, and to improve detection performance and contact determination precision without being affected by the length of the shield wire or noise or the like at the detection.

DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION

Figure 1:
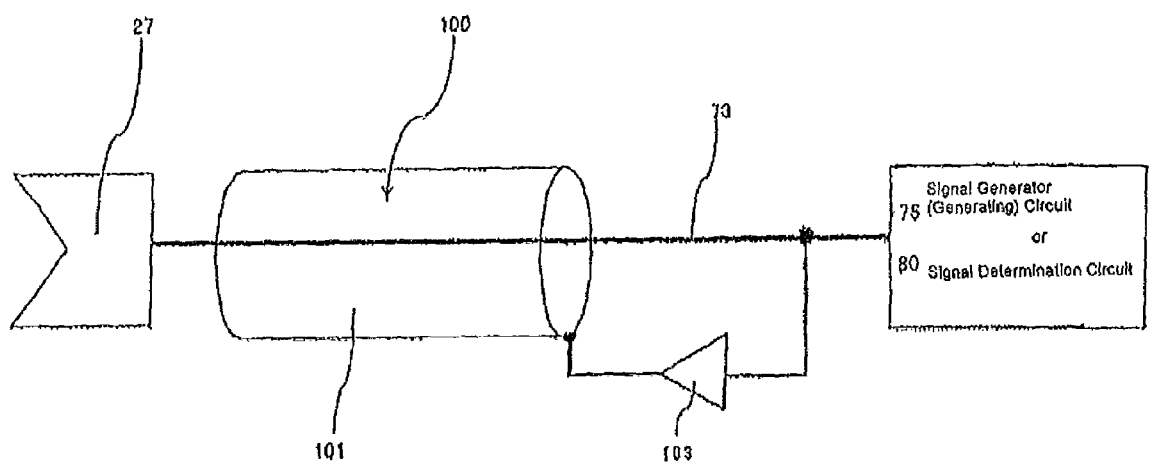
FIG. 1 Schematic view of main components in a configuration of detecting a contact between a wire core and stripping blades for a wire stripper as an embodiment of the present invention.

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

In the wire stripper of the present invention, the signal applying means may be a buffer circuit that is connected to between the electric signal generator circuit and the signal analyzer circuit, and the shielding material of the shielded wire, and outputs the signal having the same level to a side of the shielding material of the shielded wire.

In addition, when the electric signal is applied to the stripping blades and the stripping blades contact the wire core of the electric wire, the electric signal changes by the impedance of the wire core. There is provided a function of monitoring this phenomenon, which can detect a contact between the wire core and the stripping blades.

Further, there may be provided a function of arbitrarily setting the moment or the period of time when a detection is made whether or not the stripping blades contact the wire core, and monitoring each temporal element such as the time to start the stripping operation, immediately before or during the end thereof, and further the period of time when the stripping blades contact the wire core.

In this case, the temporal element monitoring function can be used to set a condition in which even if the stripping blades contact the wire core, the wire is not considered as defective depending on the contact time or the contact position. Specifically, when a detection is made whether or not the stripping blades contact the wire core, the contact position and temporal elements can be arbitrarily set to monitor the temporal elements such as the contact time between the stripping blades and the wire core, and the position thereof during the period of time immediately from the start of the stripping operation to the end thereof, the function of which can be used to determine that even if the stripping blades contact the wire core, the wire is not considered as defective depending on the degree and the position thereof so as to prevent unwanted operation stop when the wire stripper is adopted in an automatic machine and the like.

In addition, the wire stripper according to the preferred embodiment configured as an automatic machine having a function of stripping a part of the coating as well as a function of cutting the electric wire at a predetermined position is an automatic wire stripper configured such that at a front end portion of the electric wire drawn from a wire storage unit, the stripping blades are fed into the coating of the electric wire, and then the electric wire is conveyed backward to strip a part of the coating, at the time of which a core contact detecting means detects a contact of the stripping blades with the wire core; and after the coating is stripped at the front end portion, the electric wire is conveyed by a predetermined length forward, that is the drawing direction, in the state of which the electric wire is cut by the stripping blades at a position backward from the front end portion, and then the electric wire is returned backward by an expected strip length, further in the state of which the stripping blades are fed into the coating, and then the electric wire is conveyed forward to strip a part of the coating, also at the time of which the core contact detecting means detects a contact of the stripping blades with the wire core.

Note that in the wire stripper of the present invention, an electrode for detecting whether or not the stripping blades contact the wire core is actually the stripping blades; and the electric signal (input to the stripping blades) and a contact detection signal (output from the stripping blades) between the wire core and the stripping blades are applied or extracted through the same position (the stripping blades).

Further, the configuration may be such that a pair of the stripping blades are provided facing each other and sandwiching the electric wire therebetween, in the state of which after the cutting, the electric wire is configured to be movable; and the front end of the electric wire is inserted between the pair of the stripping blades, and then abuts against the front end side of a sensor rod, which starts the stripping operation.

Next, with reference to FIGS. 1 to 9, preferred embodiments of the present invention will be described.

First, a desktop wire stripper as an embodiment of the invention is described below in detail while referring to FIGS. 4, 5 and 6. The electric wire may in the following description be referred to simply as wire, as the case may be.

Figure 4:
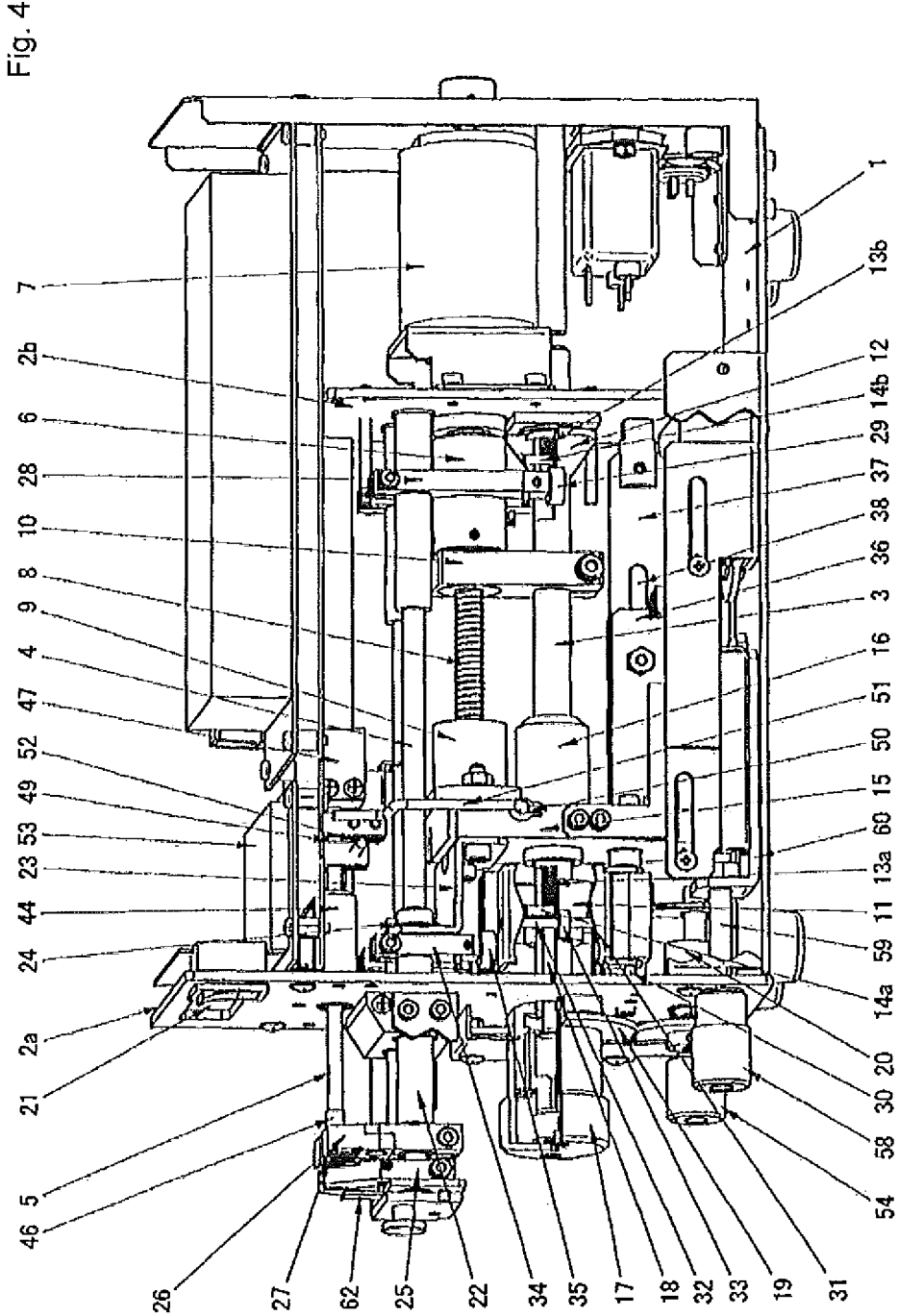
FIG. 4 View of internal structure of a desktop wire stripper as above.

The internal structure of the wire stripper according to this embodiment is described on the basis of FIG. 4. This device is of constitution equivalent to that of the wire stripper according to Japanese Patent No. 3501596 granted to the applicant, supplemented with an additional mechanism or function for detection of any contact between the wire core and the stripping blades. In the following description, the left side of the drawing corresponding to the wire insertion side is referred to as "front portion", while the right side is referred to as "rear portion".

A main spindle 3 is here borne in a rotatable and axially slidable manner in the section from the front end of machine frame 1 to the lower portion between intermediate side walls 2a and 2b while two auxiliary shafts 4, 4 which are parallel to each other are borne also in a freely rotatable manner between the side walls 2a and 2b directly above the main spindle 3. In addition, a positioning rod 5 is provided above the center between these auxiliary shafts 4, 4 to determine the position for wire end insertion and to obtain the starting signal.

A shaft is provided directly above and parallel to the main spindle 3 while the rear end of the shaft is formed as a spline shaft 6 on which the rotating shaft of an electric motor 7 located in the rear portion of the side wall 2b is fitted in a slidable manner so that rotation of the motor 7 is transmitted via the spline shaft 6 to a ball screw shaft 8 coaxial with the spline shaft 6. A ball nut member 9 is allowed to freely move axially forward and backward by rotational motion of the ball screw shaft 8. The lower portion of an arm 10 fitted between the spline shaft 6 and the ball screw shaft 8 in a freely rotatable manner grasps the main spindle 3 and causes it axially to slide so that an identical position with that of the ball screw shaft 8 may be kept.

On the main spindle 3, a first conical cam 11 and a second conical cam 12 tapering off to the front side, respectively, are fitted in a coaxially slidable manner, while compression springs 13a, 13b in the form of a coil are inserted to them, respectively, to forward press the first conical cam 11 and the second conical cam 12, respectively, with a prescribed force via pins 14a, 14b. The main spindle 3 is inserted in a bushing 16 in a slidable manner, which is fixed to a move board 15 to which in turn the ball nut member 9 is fixed.

At the front end of the main spindle 3 protruding from the side wall 2a of the machine frame 1, an incision adjusting knob 17 is provided for adjusting the incision of the blade to the wire coating in such manner that a positioning member 18 is allowed to move forward and backward by screw-through rotation of the adjusting knob 17. The positioning member 18 is so constituted to freely strike on the pin 14a of the first conical cam 11 that advance of the first conical cam 11 can be stopped. In addition, the corresponding incision diameter is indicated on an indication window 21 on the upper front part of the device in conjunction with rotation of the adjusting knob 17.

Pipe-like tube shafts 22, 22 are fitted externally to the front end of the auxiliary shafts 4, 4 in a slidable manner while the rear end of these tube shafts 22, 22 is inserted into and borne by a bearing 24 of arm 23 which is Z-formed laterally and fixed to the move board 15. The base of grippers 25, 25 is fixed to the front end of the auxiliary shafts 4, 4 protruding from the tube shafts 22, 22, while the base of blade holders 26, 26 located behind the grippers 25, 25 is fixed to the front end of the tube shafts 22, 22. The stripping blades 27, 27 having a V-shaped edge are fixed to the front faces positioned oppositely to each other in the blade holders 26, 26 as shown in FIG. 6.

Since the ball nut member 9 is fixed in position as shown in FIG. 4 at the beginning of forward rotation of the motor 7, the main spindle 3 advances along with advance of the ball screw shaft 8 as it is screwed with the balls in the ball nut member 9 by its forward rotation. Then, the conical cam 11 first pushes away the cum rollers 33, 33 to both sides to set the upper ends of oscillating members 31, 31 apart from each other while oscillating them so that the oscillating members 31, 31 push rollers 35, 35 on arms 34, 34 to rotate the tube shafts 22, 22, respectively, which form an entirety with the said rollers, and to close the blade holders 26, 26 at the front end of the said tube shafts. As a result of this, the stripping blades 27, 27 in the blade holders 26, 26 are fed into the coating 71 of wire W to a prescribed depth and clamp them as shown in FIG. 6(B).

Arms 28, 28 are fixed at the upper end to near the rear end of the auxiliary shafts 4, 4 and runs vertically down from there. Cam rollers 29, 29, which are attached to the lower end of these arms 28, 28 in a manner freely rotatable within a horizontal plane, strike on the peripheral face of the second conical cam 12 and are pushed by this peripheral face along with advance of the second conical cam 12 to rotate the auxiliary shafts 4, 4 in opposite directions to each other so that the grippers 25, 25 close along with advance of the second conical cam 12 and open along with its retraction.

The oscillating members 31, 31 are attached to both sides of the first conical cam 11 while being supported at the lower end by the side wall 2a to be capable of freely pivoting on shafts 30, 30 and cam roller 33 on a vertical shaft 32 of the oscillating member 31 abuts against the peripheral face of the first conical cam 11. Rollers 35, 35 abut against the outer side of the upper end of this oscillating member 31, while being supported at the lower end of the arms 34, 34 fixed to the tube shafts 22, 22 in a manner freely rotatable within a horizontal plane. According to advance and retraction of the first conical cam 11, the tube shafts 22, 22 rotate in opposite directions to each other via the arms 34, 34 so that the blade holders 26, 26 close along with advance of the first conical cam 11 and open with its retraction.

A brake unit 36 is interposed between the move board 15 and the side wall 2b on the rear portion of the machine frame 1. This brake unit 36 serves for ensuring a resistance to the ball nut member 9 during its backward movement and is so constituted that a plate 40 on the move board 15 side is connected via a penetrating shaft 39 to a horizontal slot 38 formed on the base 37 fixed to the side wall 2b and that a frictional braking action by spring force of a spring 41 upon a shoe 42 is given to the base 37 so as to convert the resistance of the ball nut member 9 when it returns into the gripping force of the grippers 25, 25 and the incision force of the stripping blades 27, 27, respectively.

When the timing of movement of the first conical cam 11 and the second conical cam 12 is concerned, the main spindle 3 advances by the ball screw shaft 8 while the ball nut member 9 remains fixed to close the blade holders 26, 26 by the first conical cam 11 and then to close the grippers 25, 25 along with advance of the second conical cam 12. If the second conical cam 12 stops advancing, the ball nut member 9 retracts by then arising reactive force against the load of the brake unit 36, whose resistance in turn acts on the grippers 25, 25 to close and grip the wire 63, while the coating is pulled (stripped) away from the wire core as the blade holders 26, 26 retract along with retraction of the ball nut member 9.

Figure 5:
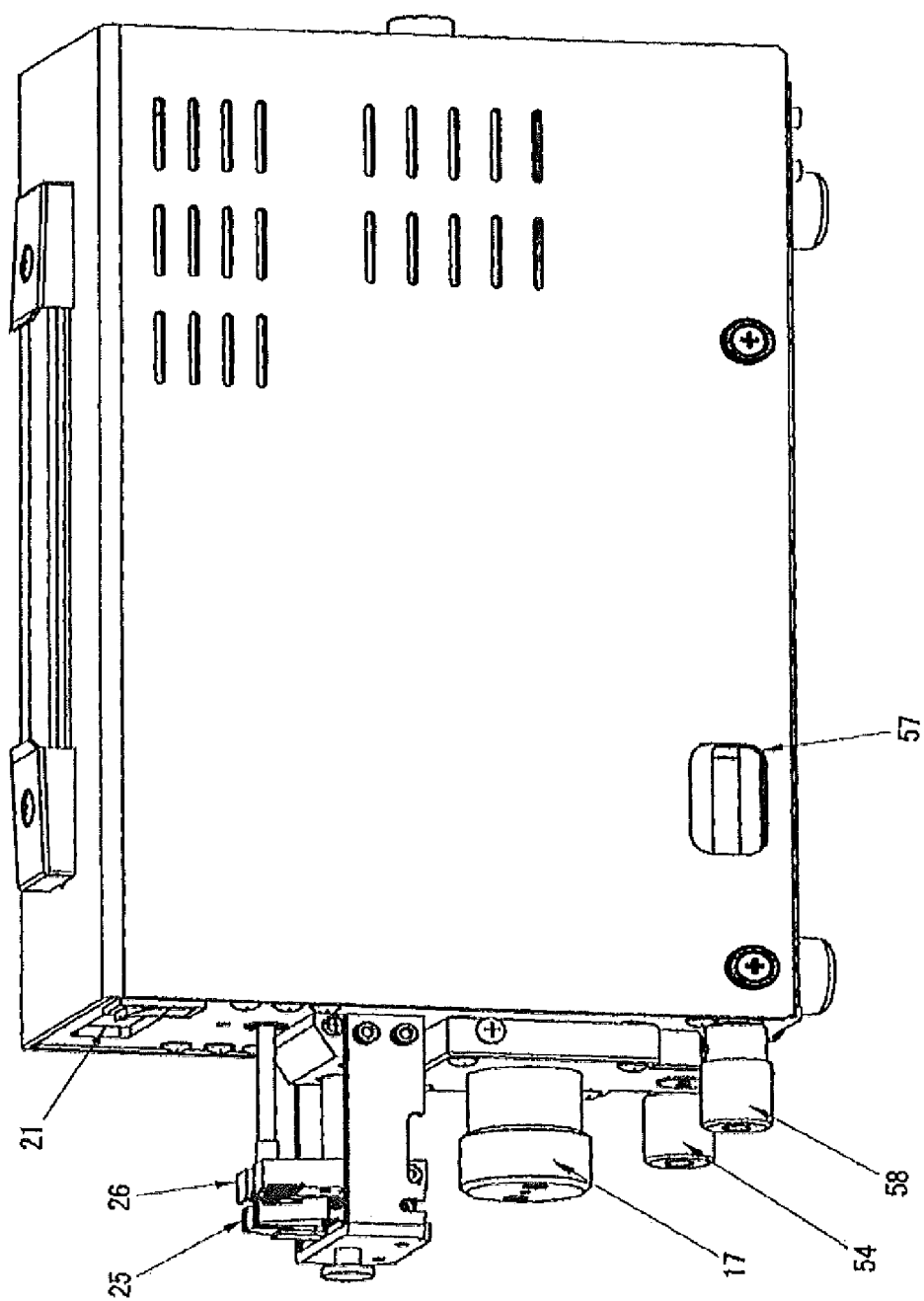
FIG. 5 External view of a desktop wire stripper as above.

As shown in FIG. 5, it is also possible by turning a knob 58 for adjusting the lead length of coating to adjust the position of a sensor 61 issuing motor reversing command, which is located on a bracket 60 screwed with a screw shaft 59 of the lead length adjusting knob 58, so as to adjust the lead length of coating. It is further enabled to indicate in the display window 57 corresponding lead length of coating converted from the position of the sensor 61 for issuing motor reversing command. Incidentally, numeral 62 in FIG. 6 stands for a supporting member for wire insertion.

By varying the position of a positioning member 56 by turning a knob 54, an outer tube 43 is, therefore, positioned by tension spring (not shown in the drawings) via a lever 51, a stopper 46 of a sensor rod 45 is positioned and the insertion depth (or point) of the wire end is set so as to choose the stripping length of coating. A turning of the knob 54 leads to indication of a stripping length of coating in the graduated indication window 57 formed on the side of the device, converted from the position of the positioning member 56 (see FIG. 5).

The blade holders 26, 26 are of vertically dual-partitioning structure where the upper portion fixing the stripping blades 27, 27 is made of an insulating material and the lower portion is composed of a metal so that the stripping blades 27, 27 are electrically isolated from the device.

In the said device according to the invention, any contact of the stripping blade 27 with the core 70 of wire W (63) is detected as follows in the course of stripping a part of the coating 71 of wire (63).

Figure 11:
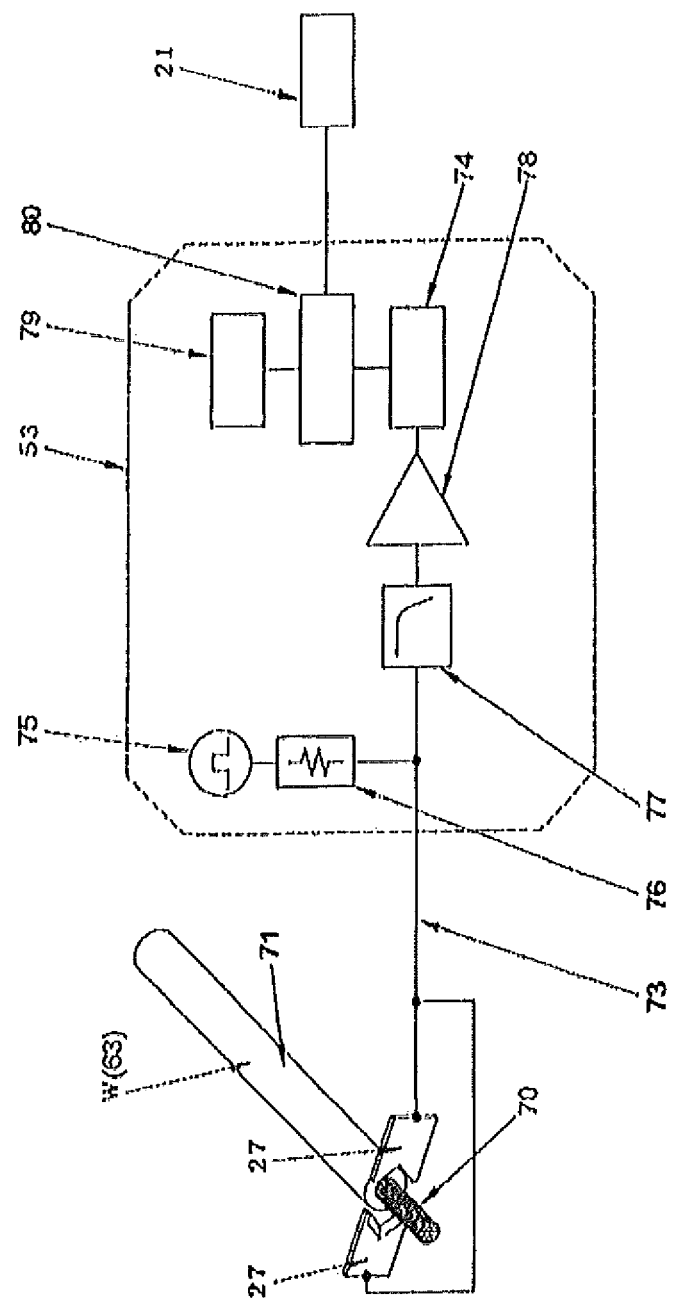
FIG. 11 Schematic view illustrating a mechanism of detecting a contact between a wire core and stripping blades as the wire stripper of the prior patented invention in the patent document 2 (Japanese Patent No. 4883821)

The stripping blades 27, 27 are connected to a control board 53 by means of a conductor 73 for impedance detection as prior patented invention shown in FIG. 11 so that impedance e.g. capacitance (the same applies to the following) can be measured through the stripping blades 27, 27 serving as electrodes. Furthermore, electric signal e.g. rectangular wave signal generated in an electric signal generation circuit 75 is transmitted via a current-limiting circuit 76 to the stripping blades 27, 27 in the circuit for detecting any contact with the core 70 of electric wire W (63).

The electric signal given to the stripping blades 27, 27 is led through a filter circuit 77 for removing noise, etc. and transmitted as prior patented invention shown in FIG. 11 to a signal analyzer circuit 74 via a signal amplifier circuit 78 for monitoring any minute change at the moment of contact of the stripping blades 27, 27 with the wire core 70. A logic circuit 80 for determination finally determines whether there has been any harmful contact between the stripping blades 27, 27 and the wire core 70 on the basis of the signal obtained from the signal analyzer circuit 74 and the preset determination time for wire coating stripping operation obtained from a control circuit 79. If determined that there has been any harmful contact, an error (Err) will be indicated in the indication window 21 with an indicator.

The said electric signal can be sampled in cycles e.g. on the microsecond time scale. If the stripping blades 27 have come in contact with the core 70 of electric wire W (63), a pulse output is generated depending on the blade position in operation to strip the coating 71 and is detected by the signal analyzer circuit 74 as a change in impedance due to addition of the impedance of the wire core 70.

In this manner, the stripping blades 27 can be used as a detection sensor to detect an impedance (including resistance, inductance, and capacitance) of the wire core 70 of the electric wire W, and thereby to be able to detect a wire core scratch with high precision under the same conditions for the electric wire cut to any length, no matter how short or how long it is.

What matters at the time of this detection is, as illustrated in FIG. 1, that a well-known buffer circuit 103 is connected between the electric signal generator (generating) circuit 75 and the signal determination circuit 80, and the shielding material 101 of the shielded wire 100; and in the shielded wire 100 having the center conductor (signal line) 73 that transmits the electric signal to the stripping blades 27 and the changed electric signal from the stripping blades 27, a signal having the same level as that of the electric signal to the stripping blades 27 or/and the changed electric signal from the stripping blades 27 is applied to the side of the shielding material (metal conductor) 101.

The electric signal from the buffer circuit 103 can greatly reduce or in some cases may eliminate the potential difference occurring between the signal line 73 of the shielded wire 100 and the shielding material 101 of the shielded wire 100, and thus to reduce or prevent current leakage through a capacitance, if any, existing between the signal line 73 and the shielding material 101, and to improve detection performance and contact determination precision of the stripping blades 27 with respect to the wire core 70 without being affected by the length of the shield wire 100 or noise or the like at the detection.

Figure 12A:
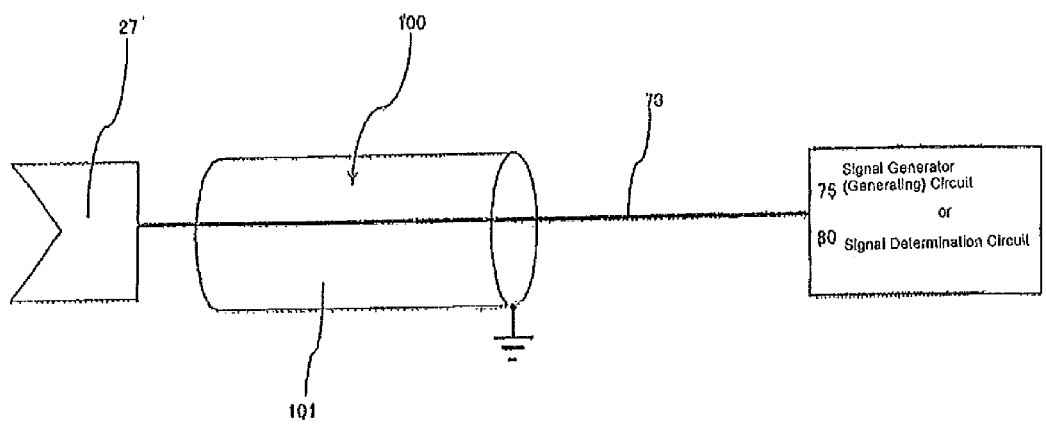
FIG. 12 Schematic view (A) of main components of a detection mechanism of the wire stripper and schematic view (B) equivalently illustrating the circumstances in which a capacitance is generated in the shielded wire of the mechanism as above.
Figure 12B:
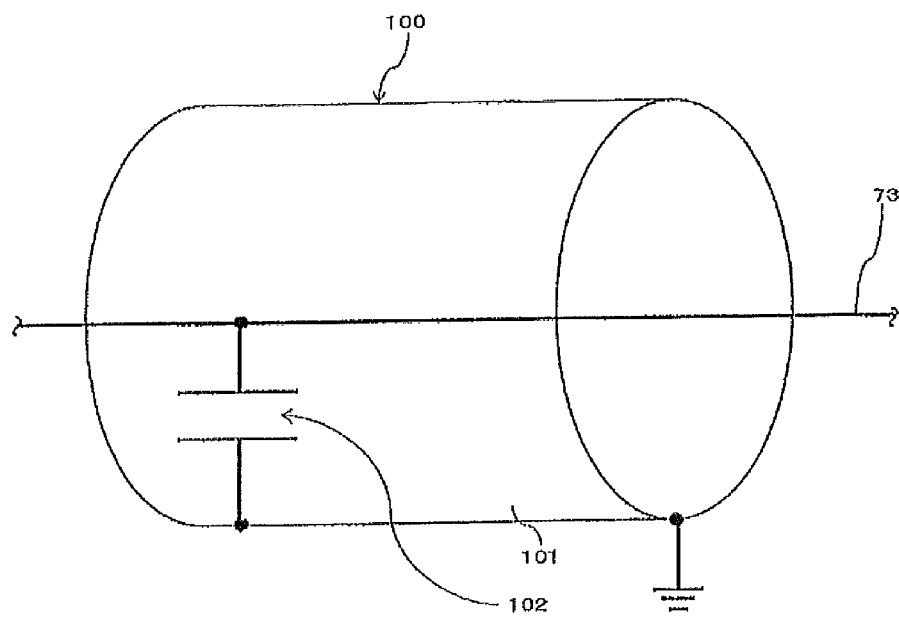

In other words, at the detection, a signal having the same level is applied to the signal line 73 and the shielding material 101 so that the signal is applied to match both phases (propagation timing). Thereby, the buffer circuit 103 can always maintain the signal level of the signal line 73 and the shielding material 101 at substantially the same level in the signal traveling direction, which can substantially eliminate the potential difference between the signal line 73 and the shielding material 101, and thus can reduce or prevent current leakage through the capacitance interposed therebetween. Thus, adverse effects by the capacitance 102 as illustrated in FIG. 12(B) can be eliminated.

As a result, this can prevent the level of the detected signal from being attenuated by a capacitance specific to the shielded wire 100 between the signal line 73 and the shielding material 101 and thus can suppress an error from occurring with respect to a standard signal, can reduce attenuation of the signal, and can improve detection performance and contact determination precision at a time of detecting a contact between the wire core 70 and the stripping blades 27. In addition, as described above, current leakage can be reduced or eliminated, thus to be able to suppress an error from occurring in the signal level due to a difference in length of the shielded wire 100 and variation in signal level due to external factors such as noise.

The configuration illustrated in FIG. 1 can be configured specifically as illustrated in FIG. 2.

Figure 2A:
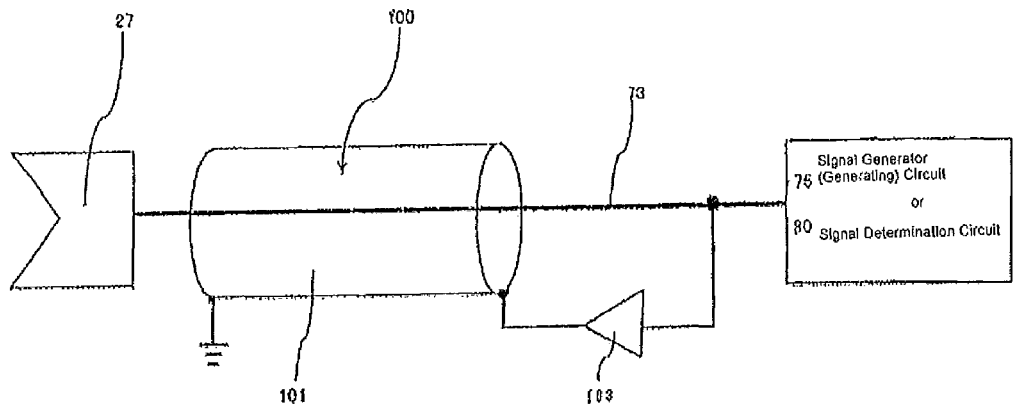
FIG. 2 Schematic view of main components illustrating embodiments (A), (B), and (C) of the configuration of detecting a contact between a wire core and stripping blades as above.

First, the configuration of FIG. 2(A) is an example in which the buffer circuit 103 is connected to one end side of the shielding material 101 and the other end side thereof is grounded to pass the electric signal along one direction of the shielding material 101.

Figure 2B:
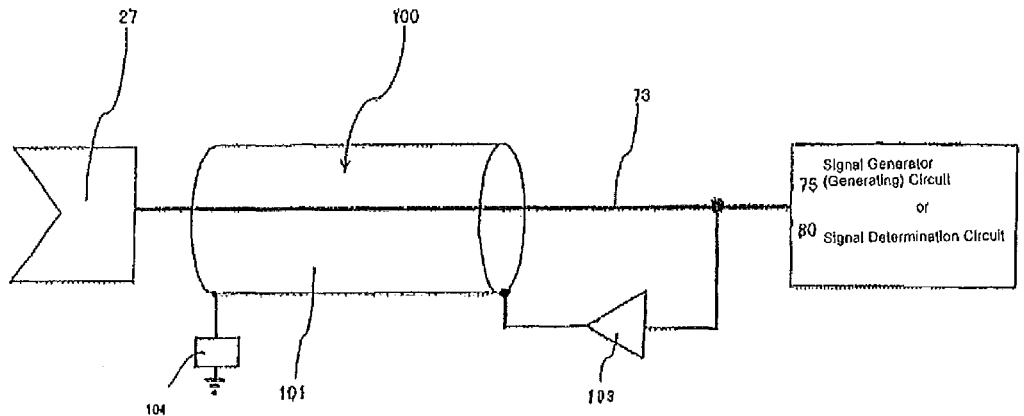

The configuration of FIG. 2(B) is an example in which a matching circuit 104 having a specific impedance is connected between the ground and the shielding material 101 in order to prevent a return signal from the ground side which may occur in the example illustrated in FIG. 2(A).

Figure 2C:
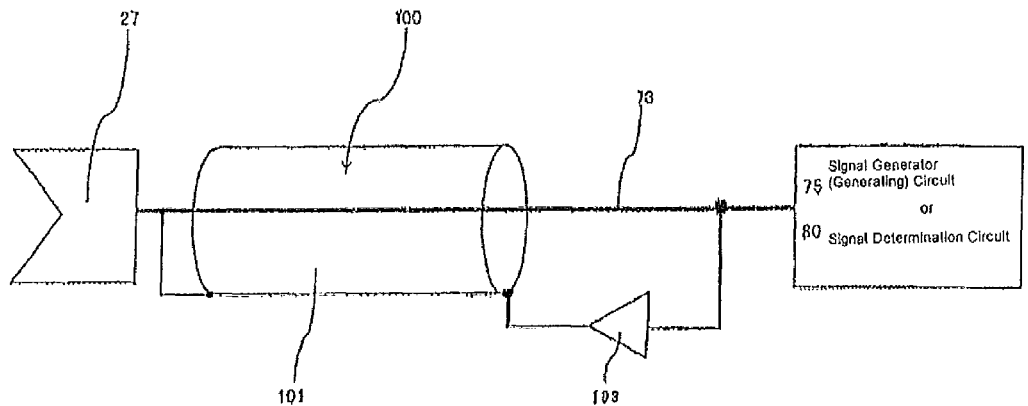
Figure 3:
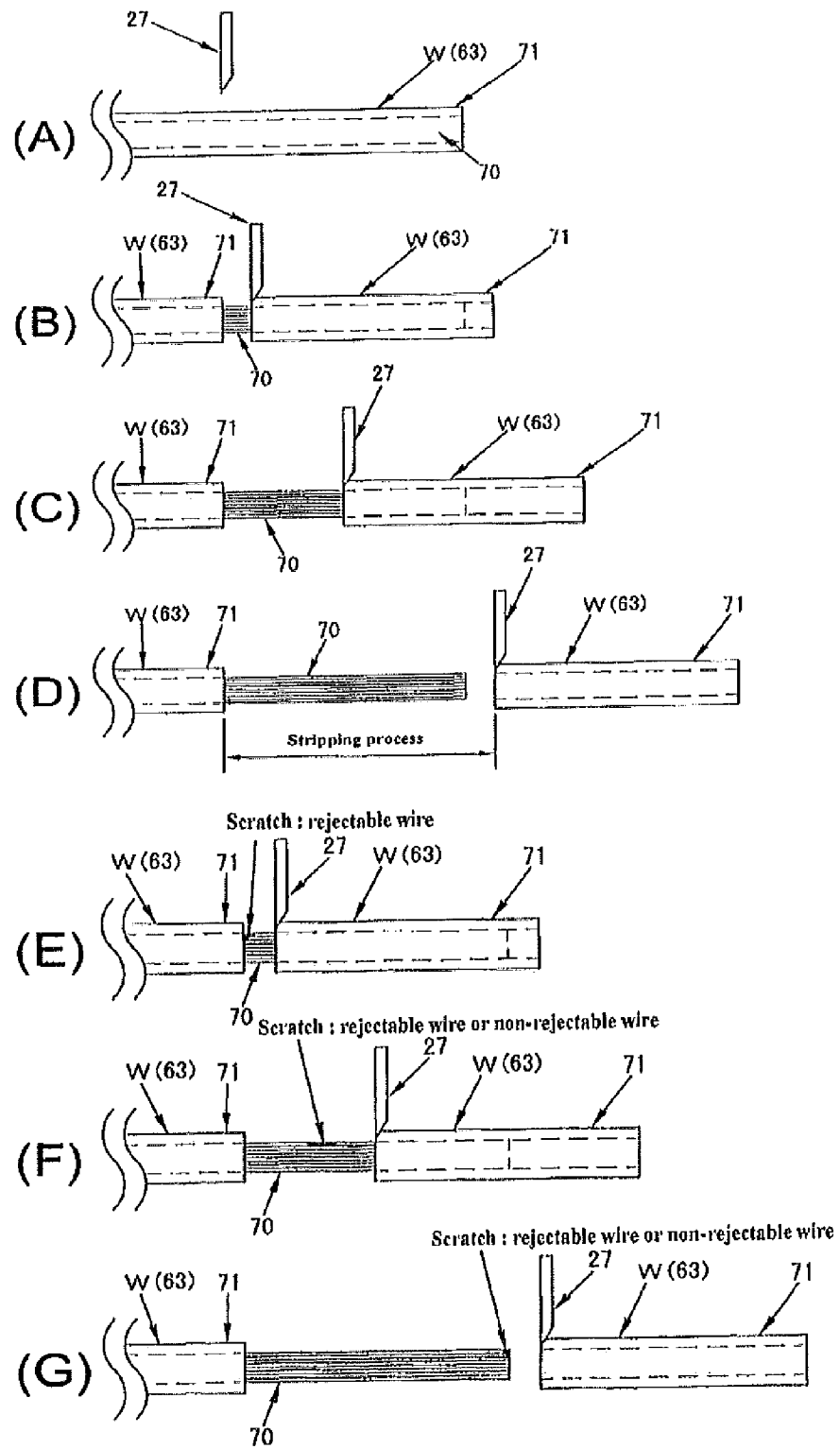
FIG. 3 Side view showing the state of setting of objective time span in stripping process for a wire stripper as above.

The configuration of FIG. 2(C) is an example in which in the same manner as in FIG. 2(A), a signal having the same level as that of the center conductor 73 is applied to the shielding material 101 through the buffer circuit 103 and the changed signal from the stripping blades 27 is guided to the side of the signal determination circuit 80 through the center conductor 73 and at the same time, the signal having the same level is also guided from the stripping blades 27 to the shielding material 101 so as to match the signal level between the center conductor 73 and the shielding material 101, thereby reducing or eliminating current leakage therebetween even if a signal returns from the stripping blades 27. Note that at this moment, it is necessary not to operate the buffer circuit 103 but to switch to a ground state.

The coating stripping operation including the said detecting operation is described next on the basis of the explanatory view of operation of the desktop wire stripper.

First, the incision adjusting knob 17 is turned to set the value indicated in the indication window 21 so as to obtain an incision depth corresponding to the diameter of electric wire to be finished. In parallel herewith, the stopper positioning knob 54 is turned to set the coating stripping length and the lead length adjusting knob 58 is turned to set the lead length to desired values, respectively, while observing the indication window 57. The volume (thickness) of the coating to be torn off can be reduced at this moment to ensure a smooth and stable stripping operation by increasing the incision depth as far as possible.

Figure 6A:
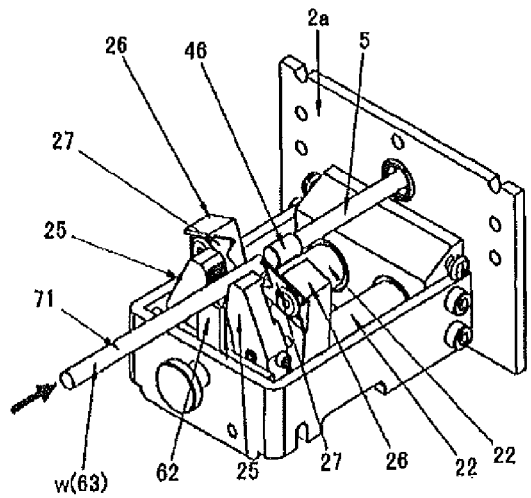
FIG. 6 Perspective view of a desktop wire stripper as above in stripping operation showing the state in which (A) electric wire is inserted into the gripper, (B) electric wire is gripped by the gripper and the stripping blades are fed into the wire coating and (C) the coating has been stripped.
Figure 6B:
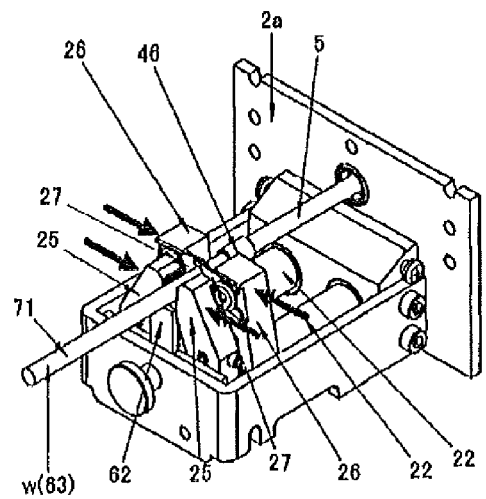

As shown schematically in FIG. 6(A), the tip of wire W (63) is inserted between the grippers 25, 25 and strikes against the stopper 46 at the front end of the sensor rod 45 to push it slightly backward so that the sensor rod 45 retracts against a weak force of spring 48 and blocks a sensor 47 with its rear end. When the sensor 47 detects a retraction of the sensor rod 45, it releases a detection signal to start the motor 7 in forward direction to advance the main shaft 3.

At the same time when the impedance immediately before the beginning of stripping operation is stored on the basis of the signal detected by the sensor 47, the said determination regarding contact detection is started. It is then continued during one process until the motor stops by a motor stop signal to determine whether the stripping blade 27 has come in contact with the core 70 of electric wire W (63).

It can be set to determine on one hand a wire product as rejectable (no good) when there has been any core contact, even if so slight as shown in FIG. 3(E), as far as the time span from FIG. 3(A) to FIG. 3(B), namely the early stage of stripping process after starting incision is concerned, but to determine on other hand a wire product also as non-rejectable which has suffered from a core contact as shown in FIG. 3(F) in the further processes. It can freely be set also by use of the temporal management function not to detect any contact between the stripping blades and the wire core immediately before termination of the stripping process, as far as the time span from FIG. 3(C) to FIG. 3(D).

It is accordingly also possible owing to the temporal management function to exclude from the objectives of determination in case of a minute contact scratch on the tip arising immediately before stripping termination as illustrated in FIG. 3(G).

Figure 8:
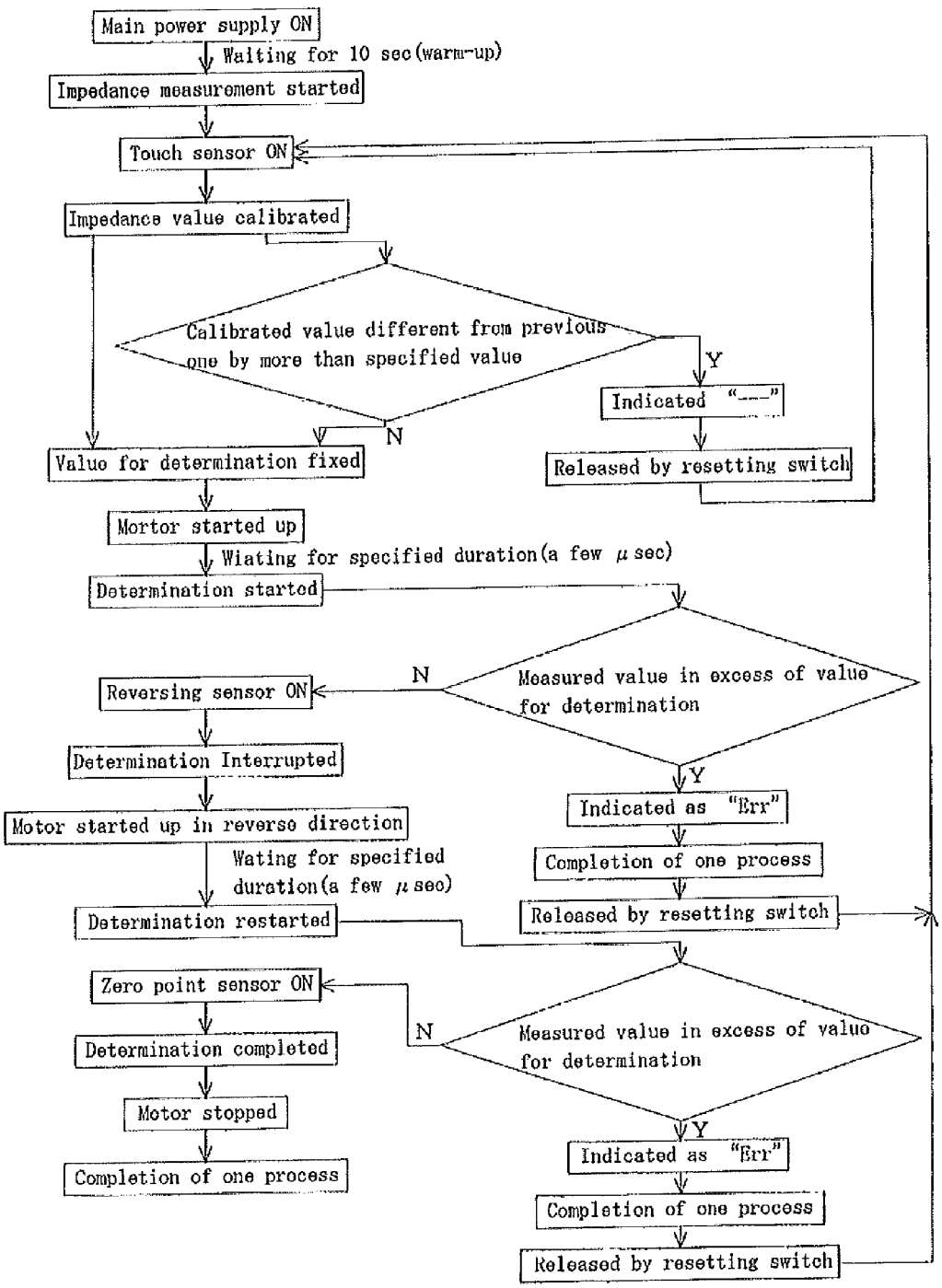
FIG. 8 Flow chart of motor operation and determination of contact for a desktop wire stripper as above.

It becomes further possible not to make determination regarding contact detection for a certain time span immediately after output of a signal for starting up, reversing and stopping the motor to prevent influences of spike noise from it at start-up, etc. in order to raise the accuracy of contact detection (see FIG. 8).

Owing to the said temporal management function, duration of contact between the wire core and the stripping blades is available as another criterion for determination. That is to say, a long-duration contact may cause a long and deep scratch, while a contact of an extremely short duration may not cause any scratch depending on the extent of contact. It is, therefore, possible when deeming the duration as a determination criterion to distinguish between an extremely short contact without affecting the wire quality and a long-duration contact by sampling the duration of contact between the wire core and the stripping blades on the microsecond time scale. The elementary equipment for the said temporal management function may be replaced with a positional information equipment such as encoder and magnet scale.

The ball nut member 9 is fixed in position as shown in FIG. 4 at the beginning of forward rotation of the motor 7 so that the main spindle 3 advances along with advance of the ball screw shaft 8 which is, by its forward rotation, screwed with the balls in the ball nut member 9. The main spindle 3 hereby pushes first the cam rollers 33, 33 in the first conical cam 11 to both sides so that the oscillating members 31, 31 oscillate to apart from each other at the upper end and push the rollers 35, 35 on the arms 34, 34 to rotate the tube shafts 22, 22 integrated with them, respectively, so as to close the blade holders 26, 26 located at the front end of the tube shafts. The stripping blades 27, 27 in the blade holders 26, 26 are then fed into the coating 71 of wire W to a prescribed depth and clamp it as shown in FIG. 6(B).

On the other hand, the advancing main spindle 3 pushes in both directions the cum rollers 29, 29 on the arms 28, 28 of the auxiliary shafts 4, 4 in the second conical cam 12 to rotate the auxiliary shafts 4,4 in opposite directions to each other so that the grippers 25, 25 close to grip the wire W.

Figure 6C:
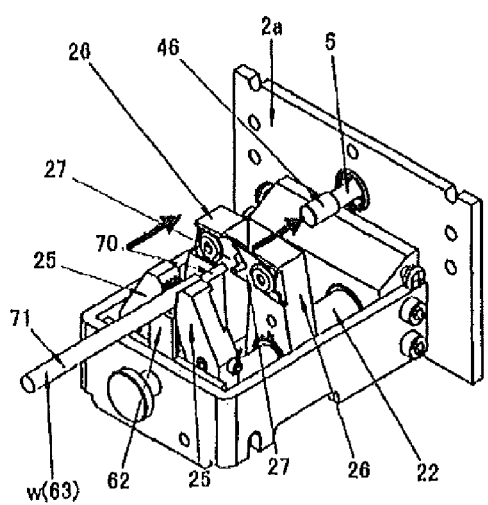

When this state has been reached, the main spindle 3 stops advancing as the front end of the positioning member 18 strikes against the pin 14a of the first conical cam 11 of the main spindle 3 so that the ball nut member 9 begins to retract by rotation of the ball screw shaft 8. Retraction of the ball nut member 9 results in retraction of the bearing 50 of the lever 51 so that the positioning rod 5 being energized by the tension spring retracts while pushing the upper end of the lever 5 1 and that the tube shafts 22, 22 retract which are connected to the auxiliary shafts 4, 4 via the arm 23. The coating 71 having been cut at the wire end by the stripping blades 27, 27 is hereby pulled away from the wire core 70 as shown in FIG. 6(C).

Figure 7:
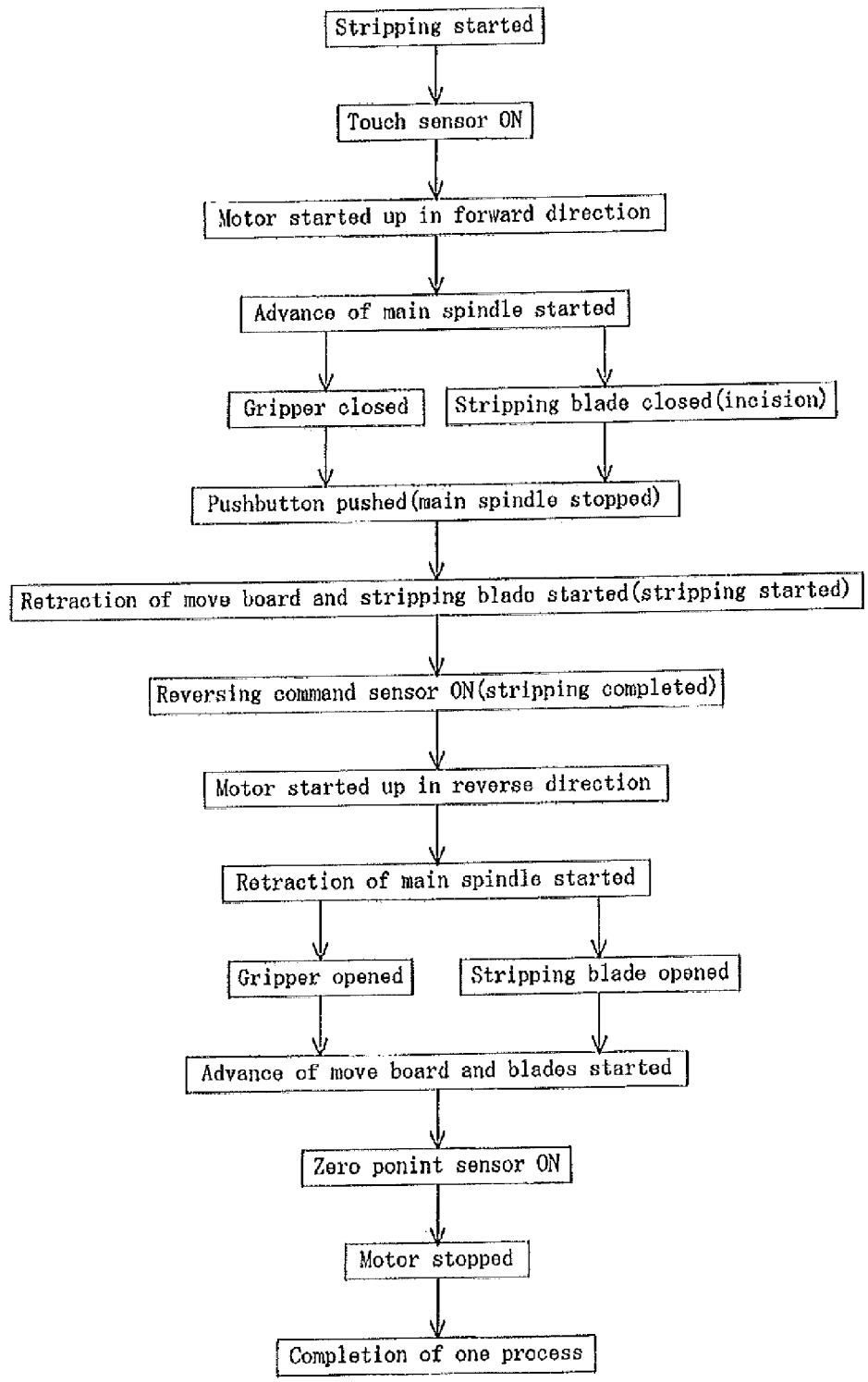
FIG. 7 Flow chart of mechanical operation of a desktop wire stripper as above.

A flow of the said stripping operation is summarized in FIG. 7 and that of the said contact determination including motor operation is shown as a whole in FIG. 8.

FIG. 9 is an explanatory view of operation of an automatic wire stripper commonly in use (in the following referred to as "automatic stripper",) to which this invention can be applied. This automatic wire stripper is furnished with a length-measuring and cutting function to cut the electric wire into constant lengths in addition to a function to strip the coating away from it.

Figure 9A:
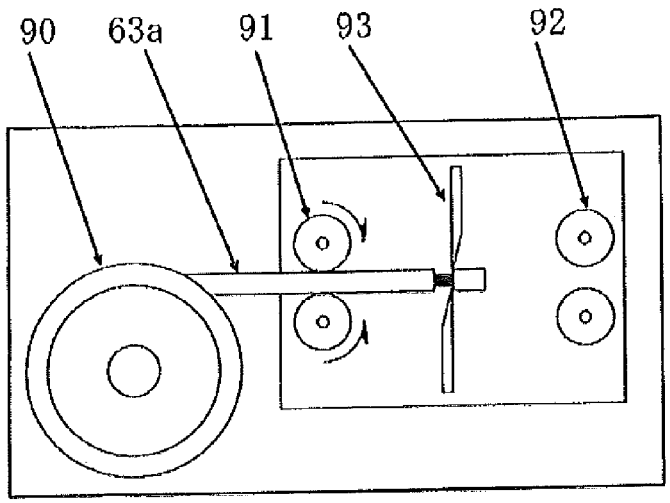
FIG. 9 Explanatory view of automatic wire stripper as another embodiment of the invention.

The electric wire 63a pulled out of a bobbin 90 in which it is housed is delivered to the front end of stripping blades 93 by means of delivery rollers 91 as shown in FIG. 9(A) and the blades 93 are fed into the coating, which is then stripped away by reversing the delivery rollers 91.

Figure 9B:
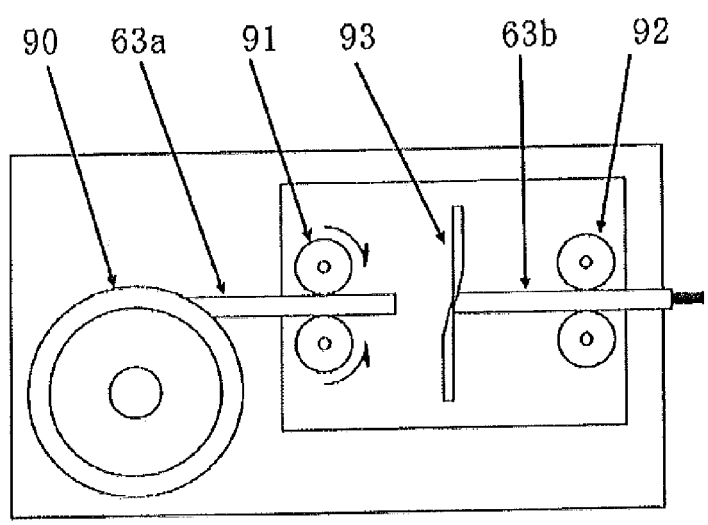
Figure 9C:
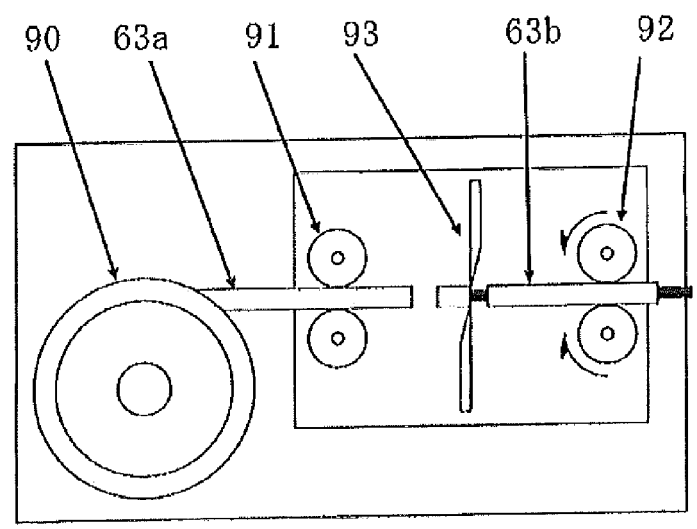
Figure 10:
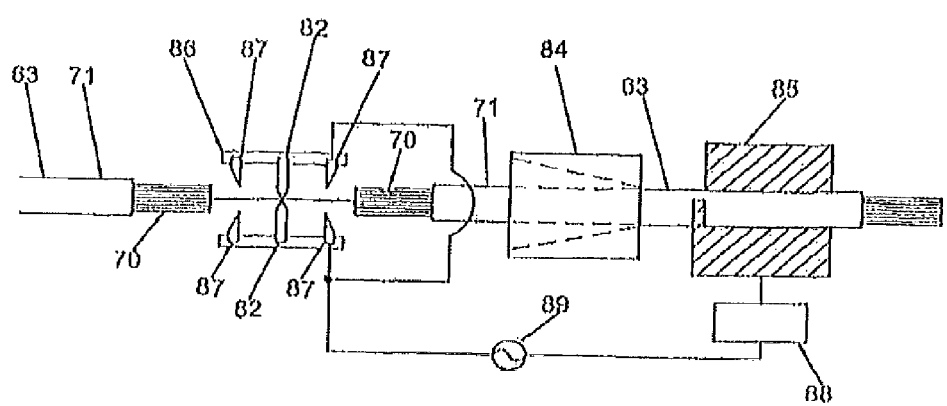
FIG. 10 Explanatory view of a wire core scratch detector according to the patent document 1 (Japanese Patent Application Laying Open (KOKAI) No. 7-87643)

Next, an electric wire 63a is delivered by a prescribed length, inserted between delivery rollers 92 and cut by means of the stripping blades 93 as illustrated in FIG. 9(B). After cutting, the stripping blades 93 are opened to return a cut electric wire 63b by the stripping length by means of delivery rollers 92 as illustrated in FIG. 9(C). The stripping blades 93 are fed again into the coating, which is then stripped away by reversing the delivery rollers 92.

This invention is suitable especially for an automatic wire stripper of high speed operation type. Although a scratch on the core of electric wire 63a according to FIG. 9 is detectable also with heretofore known core scratch detection systems, it is difficult for such systems to detect any scratch on the core of electric wire 63b which has been cut short. The said function of detecting core scratch according to this invention is valid also for such case.

As the stripping blades come in contact with the wire core with a high probability in wire stripping processes, error signal is released every time when the stripping blades and the wire core have come in contact with each other to result in a frequent stoppage of automatic strippers provided with the heretofore known systems of core scratch detection. On the contrary, this invention enables to determine a wire product also as non-rejectable even if the stripping blades have come in contact with its core according to the extent or portion of contact by above-mentioned employment of the function to manage temporal elements of contact including duration, position etc. of contact so that unnecessary operation discontinuations can be prevented.

While some embodiments of the invention have been described in the above, the working form of the invention is not limited to the said embodiments, but is variable in many ways.

For example, not only the above example in which a signal having the same level as that of the electric signal from the signal generating circuit is applied to the shielding material through the buffer circuit, but also or instead of this, a signal having the same level as that of the changed signal caused by a change in impedance from the stripping blades can be applied to the shielding material through a buffer circuit (not illustrated) connected to the stripping blades.

Instead of the above described square wave signal, a pulse signal having a constant frequency and other electric signals including an AC signal such as a sine wave may be applied. The electric signal may be generated not only by a single power source but also a plurality of power sources.

In the above described example, a change in impedance is detected by applying the electric signal, but instead of this, the present invention can be applied to the other method or mechanism for detecting a change in the electric signal from the stripping blades, for example, a change in current.

In addition, the above described the method or means of applying the signal to the shielding material may be variously changed.

INDUSTRIAL APPLICABILITY

The present invention can provide a wire stripper that can improve the function of detecting a contact between the wire core of the electric wire and the stripping blades when the end portion of the coating of the electric wire is automatically cut at a predetermined length, can improve the quality of the processed electric wire, and can improve the detection precision by reducing attenuation of the signal at detection.

REFERENCE NUMERAL LIST 5 positioning rod, 25 gripper, 26 blade holder, 27 stripping blade, 45 sensor rod, 46 stopper, 47 sensor, 53 control board, 63 (W) electric wire, 70 core, 71 coating, 73 center conductor (signal line), 74 signal analyzer circuit, 75 electric signal generator circuit, 76 current limiting circuit, 77 filter circuit, 78 amplifier circuit, 79 control circuit, 80 logic circuit for determination (signal determination circuit), 100 shielded wire, 101 shielding material, 103 buffer circuit.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A wire stripper configured to feed stripping blades into coating of an electric wire and to strip a part of the coating by moving the stripping blades relatively against the electric wire comprising:
   an electric signal generator circuit that applies an electric signal to the stripping blades;
   a signal analyzer circuit that detects an electric signal changed by a contact of the stripping blades with a wire core of the electric wire;
   a shielded wire that transmits the electric signal to the stripping blades and the changed electric signal from the stripping blades through a center conductor (signal line); and
   a signal applying means that applies a signal having the same level as that of the electric signal or/and the changed electric signal to a shielding material arranged in an outer periphery of an insulating coating of the center conductor, so that when the stripping blades contact the wire core of the electric wire in a process of stripping the coating from the electric wire, the changed electric signal is detected from the stripping blades, and thereby a contact of the stripping blades with the wire core is detected, and the signal applying means reduces or prevents current leakage between the center conductor of the shielded wire and the shielding material of the shielded wire in the detection.

2. The wire stripper according to claim 1 wherein the electric signal generator circuit generates the electric signal for the signal analyzer circuit to detect an impedance, including resistance, inductance, and capacitance, through the stripping blades; and wherein when the stripping blades contact the wire core of the electric wire in a process of stripping the coating, any change in impedance caused by addition of the impedance of the wire core to that of the stripping blades is detected, and thereby a contact of the stripping blades with the wire core is detected; and the signal applying means reduces or prevents current leakage between the center conductor (signal line) of the shielded wire and the shielding material of the shielded wire at the detection.

3. The wire stripper according to claim 1 wherein the signal applying means includes a buffer circuit that is connected between the electric signal generator circuit and the signal analyzer circuit, and the shielding material of the shielded wire, and outputs the signal having the same level to a side of the shielding material of the shielded wire.

4. The wire stripper according to claim 2 wherein the signal analyzer circuit detects any contact between the wire core and the stripping blades through the applying of the electric signal to the stripping blades and monitoring any phenomenon of change of the electric signal by the impedance of the wire core at a moment of contact of the stripping blades with the wire core.

5. The wire stripper according to claim 1 wherein the signal analyzer sets a time span or duration of detection whether the stripping blades have come in contact with the wire core and thus manages each temporal element such as the time span of contact before starting or in the course of the stripping operation or immediately before its completion as well as the duration of contact between the stripping blades and the wire core.

6. The wire stripper according to claim 5 wherein the temporal element managing function allows for setting also of conditions of determination under which the electric wire is deemed as non-rejectable, depending on duration or point of contact, even when the stripping blades have come in contact with the wire core.

7. The wire stripper according to claim 1 wherein at a front end portion of the electric wire drawn from a wire storage unit, the stripping blades are fed into the coating of the electric wire, and then the electric wire is conveyed backward to strip a part of the coating, at which time a core contact detecting means detects a contact of the stripping blades with the wire core; and after the coating is stripped at the front end portion, the electric wire is conveyed by a predetermined length in a drawing direction, whereupon the electric wire is cut by the stripping blades at a position backward from the front end portion, and then the electric wire is returned backward by an expected strip length, the stripping blades are fed into the coating, and then the electric wire is conveyed forward to strip a part of the coating, also at the time of which the core contact detecting means detects a contact of the stripping blades with the wire core.

8. The wire stripper according to claim 1 wherein the stripping blades serve as electrodes for detecting any contact between the stripping blades and the wire core, and the applied electric signal and the changed electric signal for confirming that the contact between the wire core and the stripping blades has been detected are applied and taken out respectively through a same point.

9. The wire stripper according to claim 1 wherein the stripping blades are a pair of the stripping blades placed opposite to each other across the electric wire and are adapted to allow the electric wire to be fed between, and the stripping operation is started when a leading end of the electric wire strikes on a sensor rod after passing between the pair of the stripping blades.

10. The wire stripper according to claim 1 wherein the stripping blades are operated automatically to strip a part of the coating of the electric wire and also to cut the electric wire at a prescribed position.

* * * * *